United States Patent [19]

Horowitz et al.

[11] Patent Number: 4,649,531
[45] Date of Patent: Mar. 10, 1987

[54] APPARATUS FOR CENTERING, ALIGNING AND CLAMPING AN OPTICAL DISC

[75] Inventors: Paul Horowitz, Eindhoven; Rudolf J. G. A. van der Hoorn, Nuenen, both of Netherlands

[73] Assignee: U.S. Philips Corporation, New York, N.Y.

[21] Appl. No.: 725,184

[22] Filed: Apr. 19, 1985

[30] Foreign Application Priority Data

Nov. 26, 1984 [NL] Netherlands ................ 8403582

[51] Int. Cl.$^4$ .................... G11B 9/06; G11B 17/02
[52] U.S. Cl. ..................................... 369/270
[58] Field of Search ......................... 369/270, 271

[56] References Cited

U.S. PATENT DOCUMENTS

| 2,937,916 | 5/1960 | Hohnecker | 346/137 |
| 3,729,720 | 4/1973 | Darling et al. | 340/174.1 E |
| 3,898,814 | 8/1975 | Chou et al. | 64/22 |
| 3,968,972 | 7/1976 | Morgan | 279/2 R |
| 4,068,851 | 1/1978 | Yamamura | 274/39 A |
| 4,218,065 | 8/1980 | van der Hoek et al. | 274/9 R |
| 4,562,570 | 12/1985 | Denton | 369/270 |

FOREIGN PATENT DOCUMENTS

| 0095800 | 12/1983 | European Pat. Off. |
| 2709261 | 12/1977 | Fed. Rep. of Germany |
| 2460024 | 1/1981 | France |
| 2488764 | 2/1982 | France |
| 2526204 | 11/1983 | France |
| 58659 | 4/1984 | Japan | 369/270 |
| 2074777 | 11/1981 | United Kingdom | 369/270 |

Primary Examiner—Steven L. Stephan
Attorney, Agent, or Firm—F. Brice Faller

[57] ABSTRACT

The invention relates to a device (27) for centering, aligning and clamping a rigid optical disc (29) in an operating position on a disc drive unit, which disc has a center hole which is bounded by a wall (88). The device comprises a rotatable drive spindle (57) with a centering device (63) which is situated near its free end (59) and which comprises a plurality of radially movable centering members (65) and which are pivotally connected to the drive spindle and which each comprise at least one centering surface (65b), which centering surfaces are pressed against said wall of the disc in the operating position of the disc. The centering members each comprise a radial limb (73) having an end (73a) which cooperates with a sliding bush (75) which is arranged coaxially around the drive spindle, and there are provided actuating means (83) for axially sliding the sliding bush from a first position, in which the centering members are in an operating position to center and clamp the disc, to a second position in which the centering members are in a more inward release position to mount or remove the disc. Further, there are provided resilient means (77) for returning the sliding bush from the second to the first position and for moving the centering members from their release position to their operating position (FIG. 2).

13 Claims, 9 Drawing Figures

APPARATUS FOR CENTERING, ALIGNING AND CLAMPING AN OPTICAL DISC

BACKGROUND OF THE INVENTION

The invention relates to a device for centring, aligning and clamping a rigid disc in an operating position on a disc drive unit, which disc can be inscribed and/or read when rotated and has a centre hole bounded by a wall, which device comprises a drive spindle which is rotatable about an axis of rotation and which has a free end, a centring device which is rotatable with the drive spindle and which is arranged near the free end of said spindle, which centring device comprises a plurality of radially movable centring members which are pivotally connected to the drive spindle and which each comprise at least one centring surface, centring surface being pressed against said wall of the disc in the operating position of the disc, and a disc alignment means arranged on the drive spindle to align the disc in the operating position in a plane perpendicular to the axis of rotation of the drive spindle.

Such a device is disclosed in U.S. Pat. No. 4,218,065. The known device is employed in an optical player for centring, aligning and retaining an optical disc. The centring device comprises a plurality of resilient rod-shaped centring members which are radially movable between a rest position and an operating position which is situated nearer the axis of rotation, which members are moved against their resilient action when the disc is mounted onto the drive spindle through cooperation with the wall of the centre hole of the disc. The centring members have fixed ends by which they are connected to the drive spindle and they are kinked at the ends which are remote from the drive spindle. When in the rest position at a side which is situated nearer the free end of the drive spindle, the centring members together form an uninterrupted truncated cone whose transverse dimension varies from smaller to larger than the diameter of the disc hole, and in the operating position, at a side which is situated more remote from the free end of the drive spindle, they constitute an uninterrupted cylinder having a transverse dimension equal to the diameter of the disc hole.

The radially movable centring members provide a satisfactory centring of the disc and preferably a large number of centring members is used in order to reduce the influence of local irregularities in the wall of the disc hole on the centring of the disc.

A drawback of the known device is that a comparatively large force must be exerted on the video disc to bring it into its operating position. This means that the device should always be equipped with a disc pressure means which can be brought in a position opposite the centring device. The disc pressure means is constructed to exert a load, which is directed toward the disc alignment means, on the disc which is situated on the centring device, so that the disc is pressed over the centring device under radial deformation of the centring members and is subsequently clamped against the disc alignment means. The torque required for starting the disc and rotating it during operation is applied to the disc mainly by the friction between the disc alignment means and the disc.

SUMMARY OF THE INVENTION

It is the object of the invention to provide a device of the type specified in the opening paragraph, by means of which a satisfactory centring, alignment and clamping of the disc can be obtained without the use of a disc pressure means.

To this end the invention is characterized in that the centring members each comprise a radial limb having one end which cooperates with a coaxial sliding bush around the drive spindle, there are provided actuating means for axially sliding the sliding bush from a first position, in which the centring members are in an operating position to centre and clamp the disc, to a second position, in which the centring members are in a more inward release position to mount or to remove the disc, and there are provided resilient means for returning the sliding bush from the second to the first position and for moving the centring members from their release position to their operating position.

In a device in accordance with the invention, in which the drive spindle extends vertically and the free end is situated at the top, the disc merely has to be placed with its centre hole onto the centring device. The centring members can be moved to their release position by actuation of the sliding bush, so that the disc is moved over the centring device with some clearance under the influence of the force of gravity until it bears on the disc alignment means. Subsequently, the resilient means ensure that the centring members are moved from the release position to the operating position. In the operating position the centring surfaces press against the wall of the centre hole, thereby causing the centring members to exert radial clamping forces on the disc. In the case of a suitable length of the limbs and a suitable dimensioning of the resilient means the friction torque obtained between the centring members and the disc is adequate for starting, rotating and braking the disc. Since the centring members exert only radial forces on the disc, the disc is not subjected to any axial forces which are directed towards the free end of the spindle, so that in principle the disc will have no tendency to come off the disc alignment means during operation.

If a device in accordance with the invention is used with a horizontal drive spindle, sliding the disc, which is then obviously in a vertical position, over the centring members in their release position in principle demands no effort.

Another important advantage of the device in accordance with the invention is that the disc can be centred with a very high accuracy. Surprisingly, it has been found that if the device is dimensioned correctly the practically inevitable clearance between the sliding bush and the drive spindle only results in a minimal disturbance at the location of the centring surfaces.

The invention may be employed advantageously in disc-drive units which are intended to drive optical or magnetic discs. The optical discs may be either video discs or audio discs. A disc drive unit drives video discs with the customary speed of 1500 or 1800 revolutions per minute, depending on whether the frequency is 50 or 60 Hz, and the smaller audio discs are rotated with a variable speed roughly between 180 and 600 revolutions per minute.

An embodiment of the invention, in which resilient elements secure the centring members to a mounting ring which is rigidly connected to the drive spindle, is characterized in that at said ends the limbs of the centring members are resiliently connected to and are integral with an annular portion of the sliding bush. This results in a clearance-free coupling between the sliding bush and the centring members, which is important for a uniform distribution of the forces exerted on the centring members by the sliding bush and on the disc by the centring members. For reasons of production engineering it is advantageous to manufacture the centring members with the limbs, the mounting ring and the annular portion of the sliding bush integrally formed by injection molding plastic.

Another embodiment which is favourable in view of its actuation, is characterized in that the actuating means comprise at least one lever pivoted on a pin which is fixed relative to the drive spindle. The lever cooperates with the sliding bush, the sliding bush being slidable from the first position to the second position against the resilient action of the resilient means when the lever is pivoted.

Yet another embodiment is characterized in that the actuating means comprise a plurality of levers, which levers are spaced equidistantly along the circumference of the centring device. An advantage of this embodiment is that it precludes tilting of the sliding bush during the movement from the position to the second position.

Another embodiment is particularly suitable for cooperation with a mechanical actuating device, such as a disc-loading mechanism by means of which the disc can be transferred to or removed from the drive spindle. Such an actuating device is disclosed in U.S. application Ser. No. 617,067 and the non-prepublished Netherlands Patent Application No. 8302129 and brings the disc opposite the vertical drive spindle in a horizontal movement, after which the disc is lowered onto the centring device with a downward vertical movement.

An embodiment of the invention which cooperates with an actuating device is characterized in that the or each lever comprises a first lever portion and a second lever portion, which first lever portion extends in a substantially radial direction and has a free end which cooperates with the sliding bush and which second lever portion extends in a substantially axial direction and has a free end which carries an actuating element for cooperation with an actuating device.

The actuating element, which may be constructed as a fixed projection of the lever or as a rotatable roller, can be actuated during the aforementioned vertical movement of the actuating device. The actuating element may, for example, move against a stop of the actuating device, so that the or each lever is pivoted about its pivotal axis, which results in a displacement of the sliding bush and a displacement of the centring members towards the release position. As the vertical movement of the actuating device proceeds, the cooperation with the actuating element ceases and the resilient means ensure that the centring members are set to their operating positions, causing the or each lever to be pivoted back to its original position. During the return movement of the actuating device the actuating element again cooperates with the actuating device, enabling the disc to be removed from the centring device in the release position of the centring members.

A further embodiment of the invention, which is easy to actuate, is characterized in that the sliding bush comprises at least two radial projections which are spaced equidistantly along its circumfernce and the actuating means comprise a first and a second actuating ring which are coaxial with the drive spindle, the first actuating ring being axially fixed in at least one direction relative to the second actuating ring which is rigidly connected to the drive spindle, which first ring is rotatable relative to the drive spindle and comprises helical cam profiles which are cooperable with the projections on the sliding bush, a rotation of the first ring relative to the second ring enabling the sliding bush to be slid from the first position to the second position against the resilient action of the resilient means.

This embodiment may be used, for example, in a system in which the centring device with the drive spindle is movable in a transverse direction relative to the system, The embodiment is then characterized further in that at least one of the actuating rings has an outer circumferential actuating wall for cooperation with an actuating device.

The actuating device may comprise, for example, a gear rack, which rotates the two actuating rings relative to one another when said gear rack meshes with the toothed actuating wall and when the centring device and the actuating device move relative to each other.

An embodiment of the invention, which renders the disc drive unit suitable for two types of discs having different centre holes, is characterized in that at least a plurality of the centring members comprise a further centring surface which in comparison with the said centring surface occupies an axially and radially different position viewed from the free end of the drive spindle which further centring surfaces together are capable of aligning, centring and clamping a further disc with a centre hole of different diameter in the operating position of the centring members.

An embodiment which is very suitable for accurately positioning and retaining audio discs (Compact Disc) and video discs (Laser Vision) on the same disc drive unit is characterized in that the further centring surfaces are situated nearer the drive spindle than the other centring surfaces and the centring members have radial supporting surfaces which together function as the discalignment means.

A favourable embodiment is characterized in that the resilient means comprise a helical spring which is arranged coaxially around the drive spindle, which has one end which bears against the sliding bush and another end which bears against a collar which is rigidly connected to the drive spindle. An advantage of this embodiment is that in spite of the limited space available around the drive spindle the resilient means in the form of a helical spring can be dimensioned in an optimum manner to provide the desired spring force.

In particular for those cases in which the disc occupies a vertical operating position an embodiment may be characterized in that the centring device comprises a plurality of latching hooks which extend in substantially axial directions for latching the disc in the operating position of the centring members, which latching hooks extend beyond the disc alignment means and, in the operating position of the centring members and the disc, through the centre hole of the disc to latch the disc in conjunction with the disc alignment means. These steps ensure that during operation the disc cannot come off the centring device as a result of shocks, vibrations etc. to which the device is subjected.

DESCRIPTION OF THE PREFERRED EMBODIMENT

Figure 1:
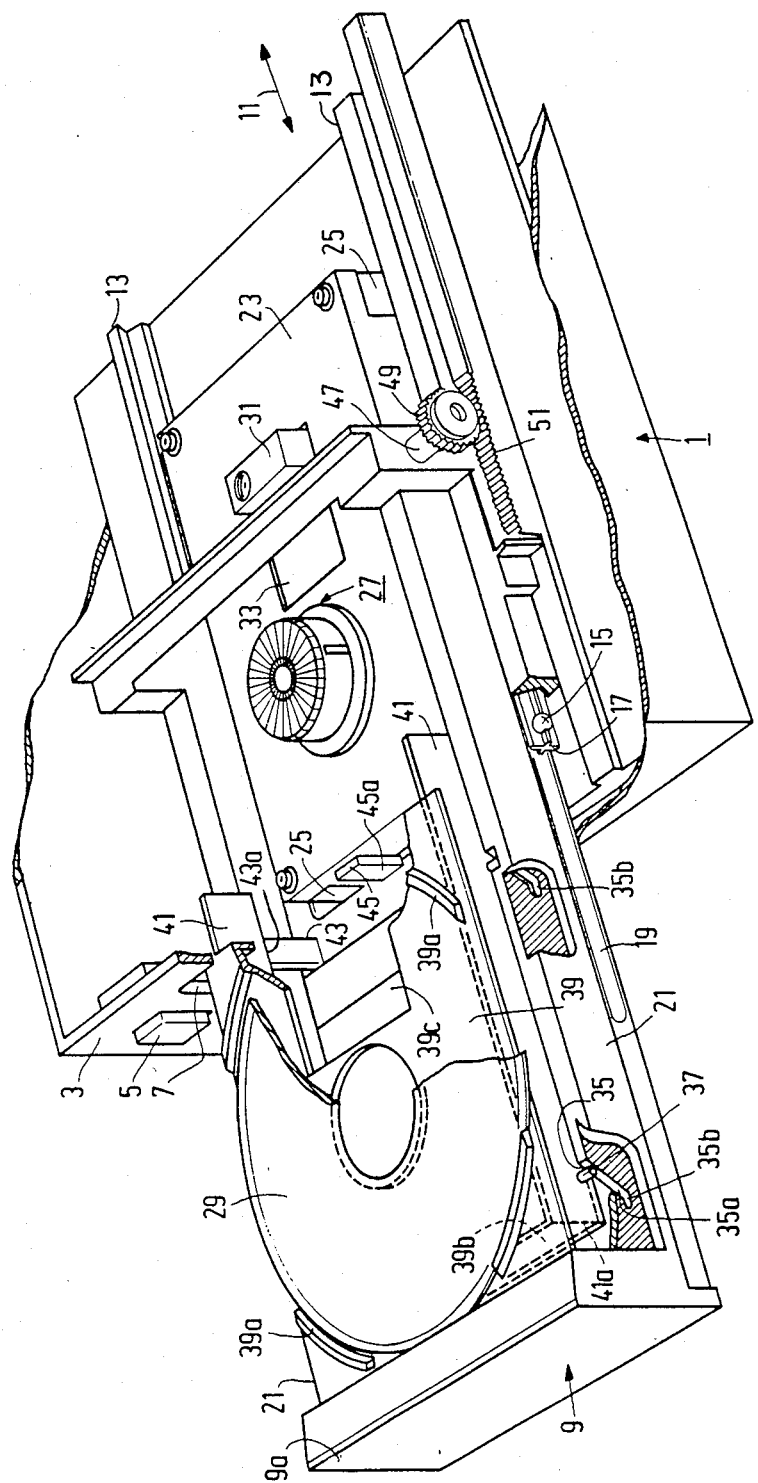
FIG. 1 is a partly cut-away perspective view of a video disc player comprising a sliding drawer and a device in accordance with the invention.

In the Figures corresponding parts bear the same reference numerals. The device in accordance with the invention may be employed in, for example, a videodisc player as shown in FIG. 1. The video disc player comprises a housing 1 with a front wall 3, an actuating button 5, and a front opening 7. A sliding drawer 9 is movable through the opening 7 between a slide-out position as shown in FIG. 1 and a slide-in position, not shown. The housing 1 further carries two fixed parallel rails 13 which cooperate with profile portions 19 in the lower parts of the side walls 21 of the drawer 9 via strips 17 provided with balls 15. A deck plate 23 is resiliently supported in the housing by means of four rubber feet 25. The deck plate 23 carries a device 27 in accordance with the invention, for centring aligning and clamping a video disc 29 in the slid-in position of the drawer 9, and a disc-drive unit in the form of an electric motor coupled to the device 27. Further, an optical unit 31 is arranged on the deck plate so as to be movable in a radial direction relative to the device 27. The optical unit 31 serves for optically reading the information on the disc 29 when the disc is rotated in its operating position. During reading the optical unit 31 is moved in an outward radial direction through a slot 33 formed in the deck plate 23.

The parallel side walls 21 of the drawer 9 are formed with grooves 35, whose main portions 35a extend obliquely downwards in the forward direction and which terminate in substantially horizontal end portions 35b. Pins 37 are movable in the grooves 35, which pins project from a transfer means 39, which is supported by the drawer 9 and on which the disc 29 is positioned between the supporting rims 39a in the extended position of the drawer 9. Preferably, the supporting rims 39a have slightly tapered inner walls to facilitate loading and also to ensure a correct centring of the disc.

On its underside the transfer means 39 carries members 41 which in the extended position of the drawer are supported by positioning elements constituted by horizontal walls 43a of supports 43 which are secured to the housing 1. The members 41 have end walls 41a which pass the supports 43 during the insertion movement of the drawer 9 so that the transfer means 39 can move in the grooves 35 from the uppermost position to a lowermost position. Near the front a fixed stop element 45 is mounted in the housing, which element comprises a stop wall 45a. An edge portion 39b, which is situated near the front underneath the transfer means 39 butts against the stop wall 45a during the slide-in movement of the drawer 9, so that when supporting function of the supports 43 ceases the pins 37 are guided in the grooves 35 as the drawer is slid further inwards and the transfer means 39 performs a vertical downward movement. The above construction is so dimensioned that the vertical movement of the transfer means is effected after the disc 39 is in a substantially coaxial position above the device 1.

As the transfer means is formed with a recess 39c, which is open at the back, the transfer means 39 is not obstructed both during a horizontal and during a vertical movement relative to the optical unit 31. During the downward movement of the transfer means the disc is lowered onto the device 1, after which the device 1 centres, aligns and clamps the disc 29 by cooperation with the dowwnardly moving transfer means. The manner in which the device performs these functions and cooperates with the transfer means 39 will be described in more detail with reference to FIGS. 2 to 6.

The vertical movement of the transfer means is limited by the horizontal portions 35b of the grooves 35. The drawer 9 reaches the end position when the pins 37 of the transfer means 39 are situated in the horizontal portions 35b, upon which the cover 9a closes the front opening 7. In this position the disc drive unit can be started automatically by means of a switch, not shown, after which playing of the disc may commence.

In order to obtain the sliding movement the drawer 9 carries a spindle 47 on which a gear wheel 49 is journalled. This gear wheel meshes with a gear rack 51 on the bottom of the housing. When the drawer 9 is slid in or slid out a motor, not shown, causes the gear wheel 49 to rotate and to move over the gear rack 51. It is obvious that the sliding movement of the drawer can be effected manually by purely mechanical means.

To start the outward movement of the drawer 9 the button 5 may be depressed, so that the gear wheel 49 is driven and moves forwards over the gear rack 51. As a result of this, the pins 35 firstly move in a backward direction through the portions 35b and 35a of the groove 35, causing the transfer means 39 to be moved upwards. The transfer means 39, which moves vertically upwards, then actuates the device 1 in a manner to be described hereinafter and subsequently lifts the disc 29 off the device 1, after which the disc is transferred to position outside the housing 1 by the outward movement of the drawer 9.

The first embodiment of the invention shown in FIGS. 2 to 5 is intended for use in a disc-record player of the type described hereinbefore.

The device 27 further comprises a drive spindle 57 which is rotatable about an axis of rotation 55, which has a free end 59, and which is coupled to an electric motor 61. A centring device 63 is situated near the free end 59 and comprises a plurality of centring members 65 which are radially movable between a release position (see FIGS. 4 and 5) and an operating position (see FIGS. 2 and 3).

A cylindrical element 67 is connected to the drive spindle 57 by means of a hub 69 which has been shrunk onto the drive spindle 57. A mounting ring 71 is clamped inside the cylindrical element 67 and is integrally injection-moulded with the centring members 65 which are elastically deflectable at the location of the hinge 65a. The injection-moulded product may be made of, for example, polycarbonate to which a silicone oil has been added.

The centring members 65 each comprise a limb 73, which extends in a radial direction towards the axis of rotation 55 and which has a free end 73a which rests on a sliding bush 75 which coaxially surrounds the drive spindle 57. The sliding bush 75, which is axially slidable relative to the drive spindle 57 and the hub 69 which is secured thereto, is formed with a coaxial recess 77 in which a helical spring 79 is mounted. The helical spring is retained between a wall portion 75a of the sliding bush 75 and a bottom portion 67a of the cylindrical element 67.

A collar 81 of the sliding bush 75 is in engagement with three levers 83, which are spaced equidistantly along the circumference of the cylindrical element 67. The levers 83 are situated in slots 67b formed in the cylindrical element 67 and are each pivotable about a spindle 85 which is secured to the cylindrical element 67. The spindles 85 are disposed in a plane which extends transversely of the axis of rotation 55 and are oriented tangentially of the axis of rotation 55. A portion 83a of each lever 83 extends in a radial direction and its free end is formed with a notch in which the collar 81 of the sliding bush 75 engages. Another portion 83b of each lever extends in an axial direction and near its free end it carries an actuating projection 87 on its side is remote from the axis of rotation 55.

Figure 2:
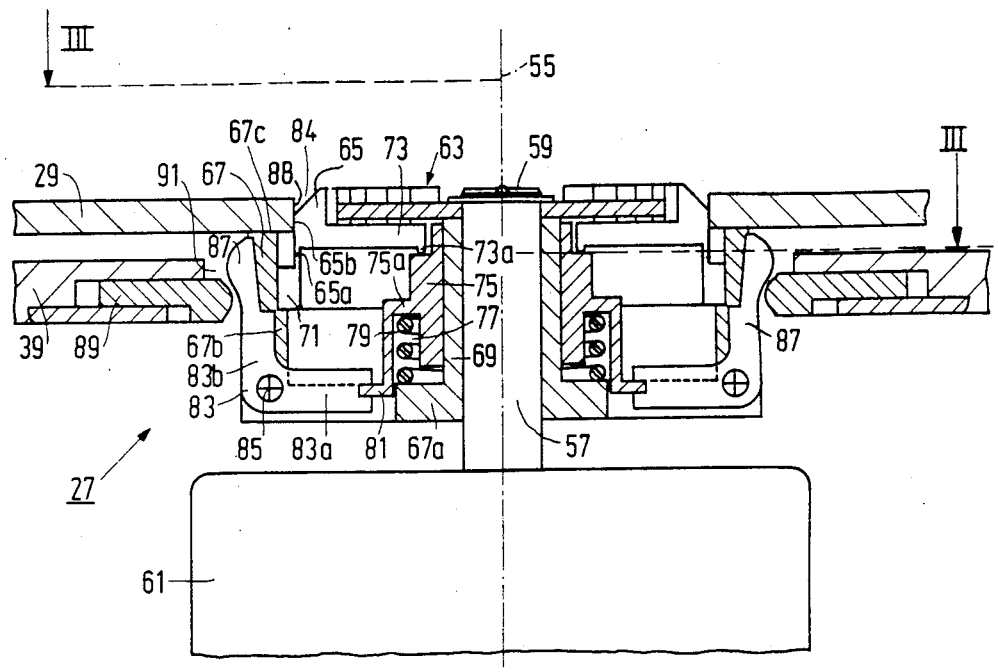
FIG. 2 is a longitudinal sectional view taken on the line II—II in FIG. 3, showing a first embodiment of the invention in which the centring members are in an operating position.
Figure 3:
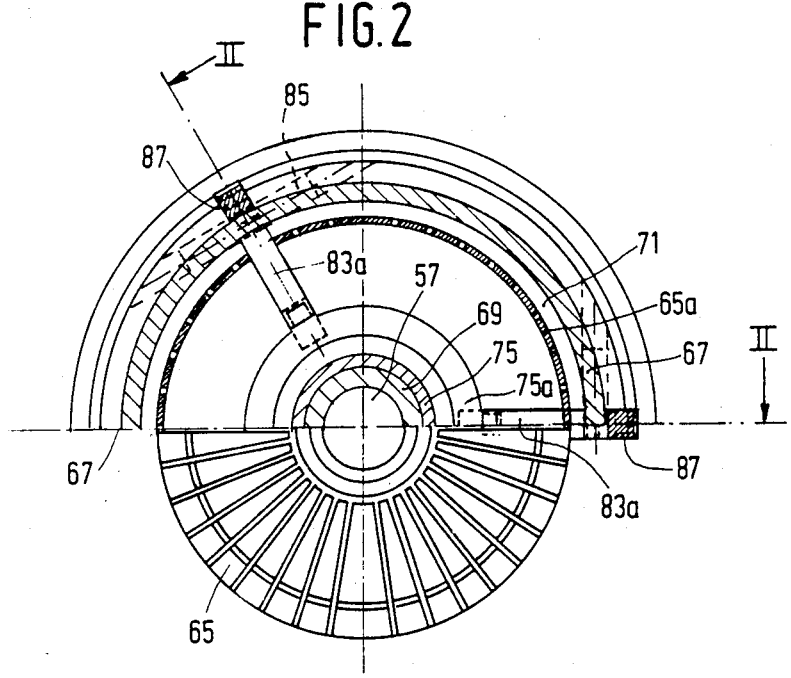
FIG. 3 is a partly schematic view taken on the line III—III in FIG. 2.

In the situation shown in FIGS. 2 and 3, in which the device 27 cooperates with a video disc 29 which is in the operating position and which has a centre hole which is bounded by a wall 88. The sliding bush 75 is then in a first position and the centring members 65 occupy in their operating position. The helical spring 79 exerts a force directed towards the centring members 65 on the sliding bush 75, so that the centring surfaces 65b of the centring members are urged against the wall 88 of the video disc 29. In this situation the disc 29 is centred correctly relative to the axis of rotation 55, the upper rim 67c of the cylindrical element 67 functioning as disc alignment means.

Experiments have shown that a particularly firm clamping and an excellent centring can be achieved if a specific ratio between the radial and the axial dimensions of the centring members is chosen. These dimensions are designated r and a for a centring member 65 which is shown on an enlarged scale in FIG. 6. The dimension r is the radial distance between the ends 65a and 75a of the centring member 65 and the dimension a is the axial distance between the end 65a and the centring surface 65b. Very good results are obtained with a ratio of roughly 4:1 between r and a. If this ratio is chosen, for example small dimensional errors and slight clearances of the sliding bush will hardly affect the correct operation of the device, in particular the centring. Obviously, other ratios between r and a of the same order of magnitude may be chosen.

For removing or mounting the video disc 29 the centring members 65 should be set to the release position. For this purpose the actuating projections 87 cooperate with an actuating device, which in the present embodiment comprises the vertically movable transfer means 39 of the drawer 9. The transfer means 39, which has a central opening 91 for an unobstructed vertical movement of the transfer means 39 relative to the device 27, carries an annular element 89 which projects into the central opening 91 over a small distance. During the vertical movement of the transfer means 39 the element 89 butts against the actuating projections 87, which gives rise to a pivotal movement of the lever portion 83 which is directed towards the axis of rotation 55, causing the sliding bush 75 to be moved to its second position and the centring portions 65 to their release position. This is the situation as shown in FIGS. 4 and 5.

Figure 4:
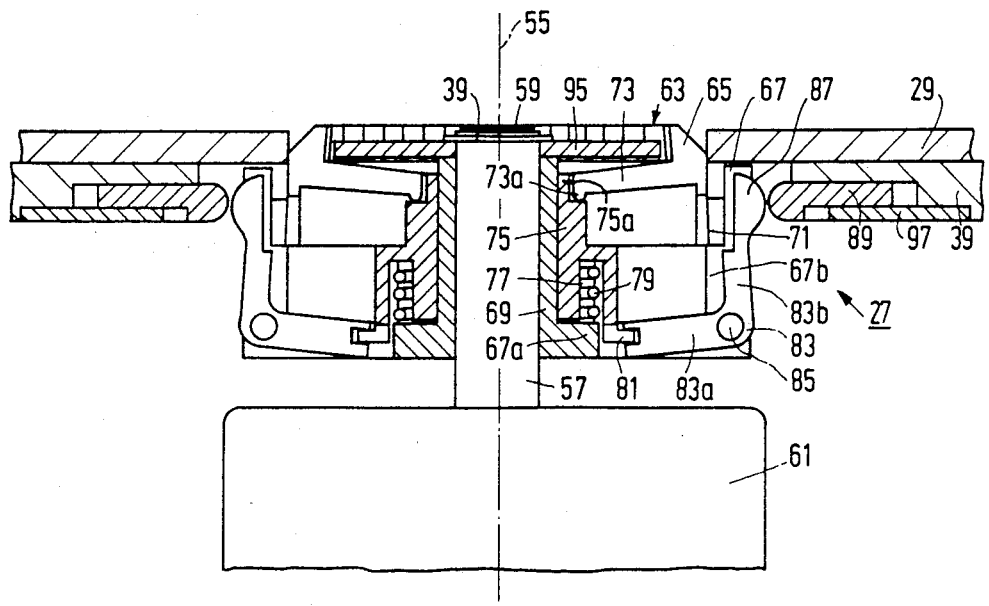
FIG. 4 is a longitudinal sectional view of the first embodiment, showing the centring members are in the release position.
Figure 5:
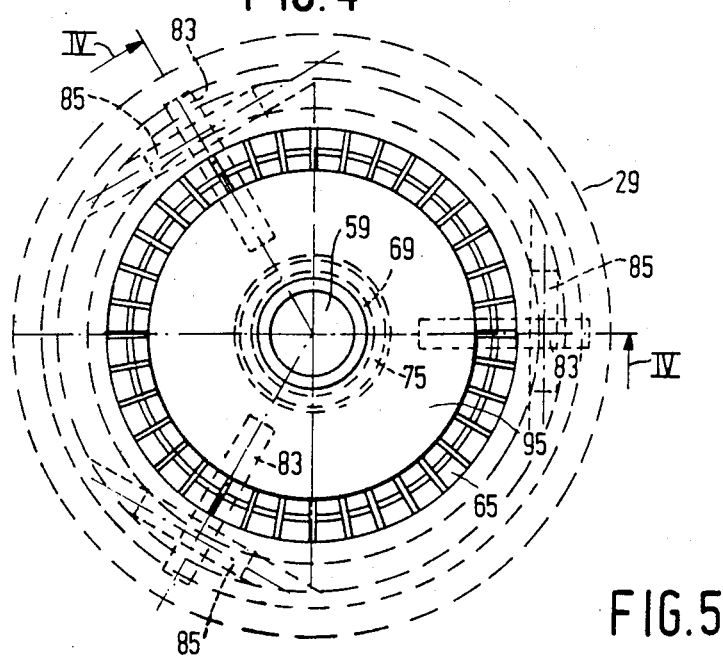
FIG. 5 is a partly schematic plan view of the embodiment shown in FIG. 4.
Figure 6:
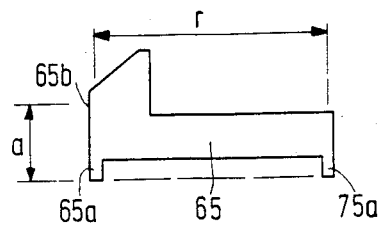
FIG. 6 shows a centring portion on an enlarged scale.

Starting from the situation shown in FIGS. 4 and 5, the transfer means 39 can perform two movements. The transfer means 39 can carry out a downward movement to obtain the situation shown in FIGS. 2 and 3, or the transfer means 39 can perform an upward movement, causing the disc 29 which lies loosely on the centring device 63 to be lifted off the device 27 by the transfer means 39, after which the centring members 65 move radially outwards under the influence of the helical spring 79 when the projections 87 are released.

The free end 59 of the drive spindle 57 carries a disc 95 which is retained by a retaining ring 93 and which limits the travel of the sliding bush 75 and the centring members 65 which cooperate therewith.

For the centring relative to the device 27 the annular element 89 may exhibit some radial clearance relative to the transfer means 39. A disc 97 retains the element 89 of the transfer means 39.

The second embodiment shown in FIG. 7 bears much resemblance to the first embodiment described above and will be described briefly.

Figure 7:
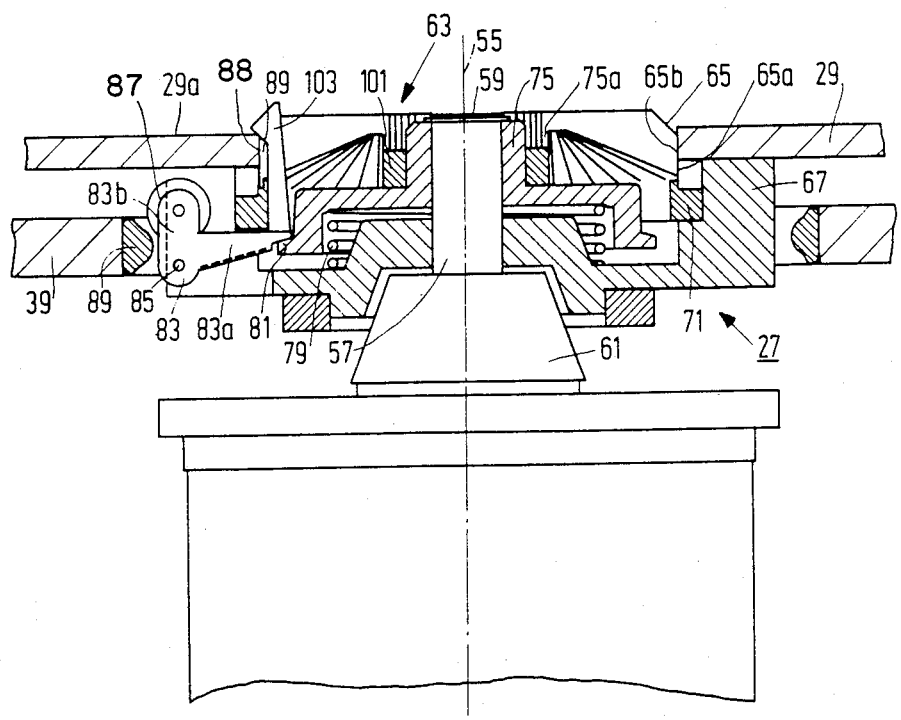
FIG. 7 is a longitudinal sectional view of a second embodiment.

FIG. 7 shows a device 27 in the situation in which the centring members 65 are in the operating position and retain an optical disc 29 in its centred position. A spring force, provided by the helical spring 79, urges the sliding bush 75 towards the free end 59 of the drive spindle 57 and hence the centring surfaces 65b of the centring members 65 against the wall 88 of the disc 29. The cylindrical element 67, which is secured to the spindle 57 and which functions as a disc alignment means, ensures a correct alignment of the disc 29 relative to the axis of rotation 55. The sliding bush 75 carries an annular portion 101 which is integral with the centring members 65 and with the ring 71 connected to these members. Suitably, the centring device 63 which comprises the centring members 65, the ring 71 and the annular portion 101, is manufactured by injection-moulding. In this centring device 63 the ends 65a and 73a of the centring members 65 are connected to the drive spindle 57 and the sliding bush 75, respectively, so as to be elastically deflectable, which may yield extremely well defined displacements of the centring members 65.

Three levers 83 are spaced equidistantly along the circumference of the cylindrical element 67, only one of the levers being shown in FIG. 7. The levers 83 are pivotable about the pivot pins 85, which are fixed relative to the drive spindle 57. The levers have respective actuating projections 87 on the lever portions 83b. In a manner similar to that described for the first embodiment the actuating projections 87 cooperate with the annular element 89 of the transfer means 39. In the present embodiment the levers 83 each comprise a latching projection 103 situated near the free end of the lever portion 83a which bears against the collar 81 of the sliding bush 75. The latching projections 103 project through the centre hole of the disc 29 and are tightly positioned against the edge portion of the disc 29 constituted by the wall 88 and the top surface 29a of the disc 29. Owing to the presence of the latching projections 103 this device 27 is particularly suitable for use in disc-record players in which the drive spindle 55 is in a horizontal position.

Figure 8:
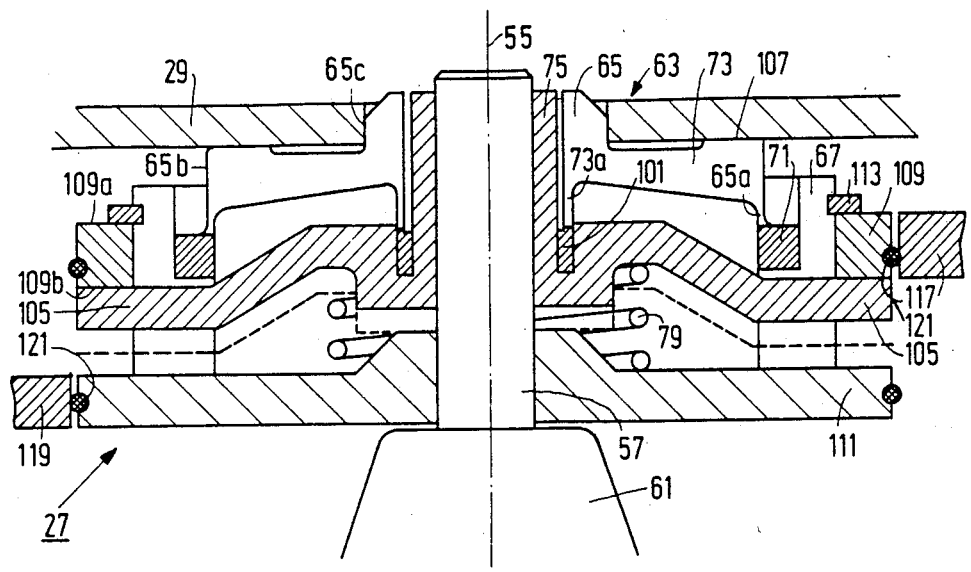
FIG. 8 is a longitudinal sectional view of a third embodiment.
Figure 9:
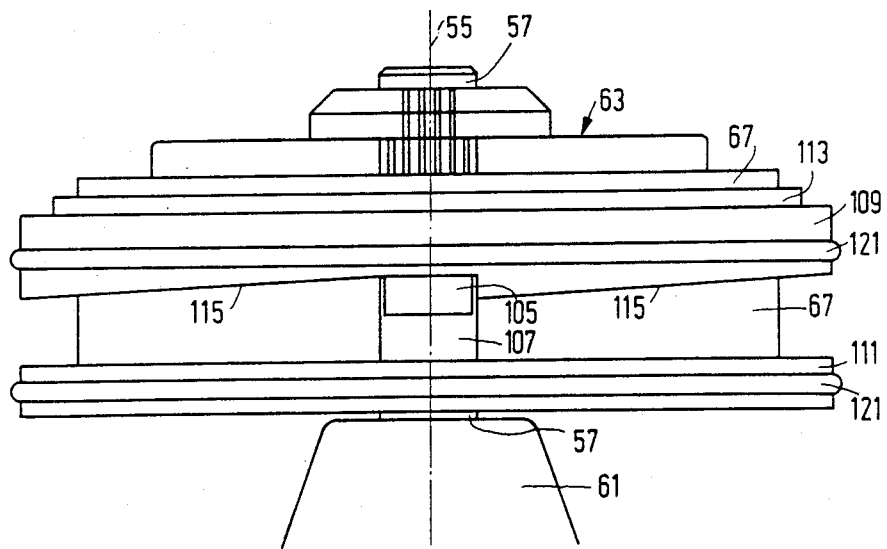
FIG. 9 is a side view of the embodiment shown in FIG. 8.

The device 27 in accordance with a third embodiment of the invention shown in FIGS. 8 and 9, like the preceding embodiments, comprises a drive spindle 57 coupled to a motor 61, and a centring device 63 which is rotated with the drive spindle 57 and which comprises a plurality centring members 65. The device 27 further comprises a sliding bush 75 which is coaxially slidable relative to the drive spindle 57. The sliding bush 75 comprises two diametrally arranged radial projections 105, which each projects through an opening 107 in a cylindrical element 67 which is rigidly secured to the drive spindle. On its inner side the cylindrical element 67 is provided with a mounting ring 71 for the centring members 65. An annular portion 101 is mounted in a recess in the sliding bush 75 at substantially the same level as the ring 71. Suitably, the centring members 65, the mounting ring 71 and the annular portion are made in one piece of a plastics, the centring members 65 being pivotable relative to the ring 71 and the annular portion 101 by means of elastic pivots at the location of 65a and 73a, between which pivots the limb 73 extends.

The device 27 shown in FIGS. 8 and 9 is suitable for centring, aligning and clamping two different types of disc, the main difference being the difference in diameter of the centre holes of the discs. The centring members 65 comprise centring surfaces 65b and further centring surfaces 65c. Both the centring surfaces 65b and the centring surfaces 65c can together constitute a continuous cylinder which is coaxial with the drive spindle 57, the cylinder constituted by the centring surfaces 65c having the smaller cross-sectional dimension. The centring surfaces 65b may be employed, for example, for mounting a video disc and the centring surfaces 65c for mounting an audio disc, assuming that the video disc has a larger centre hole than the audio disc. In either case the disc can be mounted or removed in the release position of the centring members 65. FIG. 8 shows a disc 29' which is centred and clamped by means of the centring surfaces 65c. The disc 29' rests on the limbs 73 of the centring members 65, which each have a supporting surface 107, the supporting surfaces 107 together functioning as the disc alignment means.

In the present embodiment the sliding bush 75 and hence the centring members 65 are moved by an axial displacement of the two projections 105. This displacement is obtained by a rotation of two actuating rings relative to each other, namely a first actuating ring 109 and a second actuating ring 111. The second actuating ring 111 forms part of the cylindrical element 67 and is therefore rigidly connected to the drive spindle 57. The first actuating ring 109 is mounted for rotation around the cylindrical element 67 and is axially retained at a side 109a by means of a retaining ring 113 which is secured to the element 67. If desired, it may also be retained at the other side 109b. The two said projections 105 are urged against the side 109b of the first ring 109 by a helical spring 79 which acts on the sliding bush 75. The side 109b of the first ring 109 has two helical cam profiles 115 which each extend over roughly one half of the circumference. When the first ring 109 is rotated relative to the second ring 111, which is for example stationary, the projections 105 each cooperate with one of the cam profiles 115, causing the sliding bush 75 to be moved from the first to the second or from the second to the first position depending on the direction of rotation.

One or both rings 109 and 111 may be rotated mechanically by means of an actuating device, which may comprise for example a frame which is movable relative to the device 27 and transversely of the axis of rotation 55, which frame comprises two members 117 and 119 which are positioned against the first ring 109 and the second ring 111, respectively. During the relative displacement in the said direction of the members 117 and 118 with respect to the device 27 the rings 109 and 111 are rotated in opposite directions, thereby providing the required movement of the sliding bush. In order to improve the contact between the rings 109 and 111 and the members 117 and 119 an intermediate rubber ring may be interposed.

What is claimed is:

1. A device for centering, aligning and clamping a rigid disc in an operating position in a disc drive unit, said disc having a center hole bounded by a wall, said disc being subject to inscription and/or reading when rotated in said disc drive unit, comprising:
   a drive spindle rotatable about an axis of rotation, said drive spindle having a free end;
   disc alignment means arranged on said drive spindle to align said disc in an operating position in a plane perpendicular to the axis of rotation of said drive spindle;
   a coaxial sliding bush positioned around said drive spindle and slidable along said spindle from a first position to a second position;
   a centering device positioned near the free end of said spindle and rotatable with said spindle, said centering device including a plurality of radially movable centering members, said centering members at one end being resiliently connected to and pivotable about a mounting ring which is fixed relative to said drive spindle, said members having first centering surfaces for moving and pressing radially outwardly against said wall of said disc center hole when said disc is in said operating position, said centering members each extending radially inward from said mounting ring to an opposite end which cooperates with said coaxial sliding bush;
   actuating means for axially sliding said sliding bush from said first position to said second position;
   resilient means for returning said sliding bush to said second position from said first position,
   said centering members pivoting, when said sliding bush moves from said first to said second position, to press radially outward against said wall of said disc center hole, said centering members moving towards said spindle to release said first centering surfaces from said hole wall when said sliding bush moves from said second to said first position, said cooperation between said sliding bush and each said centering member causing said pressing and releasing movements of said first centering surfaces.

2. A device as claimed in claim 1, wherein said actuating means include at least one lever pivotable about at least one respective pivot pin which is fixed relative to said drive spindle, said at least one lever cooperating with said sliding bush, said sliding bush being slidable from said first position to said second position against the resilient action of said resilient means when said lever is pivoted about said pivot pin.

3. A device as claimed in claim 2, wherein said actuating means includes a plurality of levers, said plurality of levers being spaced equidistantly along the circumference of said centering device.

4. A device as claimed in claim 2, and further comprising disc transfer means movable in a substantially axial direction and wherein said at least one lever includes a first lever portion and a second lever portion, said first lever portion extending in a substantially radial direction relative to said drive spindle and having a free end, said first end cooperating with said sliding bush, said second lever portion extending in a substantially axial direction and having a free end carrying an actuating element for cooperating with said disc transfer means.

5. A device as claimed in claim 1, wherein said sliding bush includes at least two radial projections, said radial projections being spaced equidistantly along the circumference of said sliding bush, said actuating means including a first and a second actuating ring, said first and second actuating rings being coaxial with said drive spindle, said first actuating ring being axially fixed in at least one direction relative to said second actuating ring, said second actuating ring being rigidly connected to said drive spindle, said first ring being rotatable relative to said drive spindle and including helical cam profiles, said cam profiles being cooperable with projections on said sliding bush, rotation of said first ring relative to said second ring enabling said sliding bush to slide from said frist position to said second position against the resilient action of said resilient means.

6. A device as claimed in claim 5, and further comprising an actuating device, and wherein at least one of said actuating rings has an outer circumferential actuating wall for cooperation with said actuating device.

7. A device as claimed in claim 1, wherein at least a plurality of said centering members include a second centering surface, each said second centering surface occupying an axial and radial position different from that of said first centering surface, said second centering surfaces being adapted for aligning, centering and clamping a disc having a center hole of different diameter from a disc subject to said radial pressing by said first centering surfaces.

8. A device as claimed in claim 7, wherein said second centering surfaces are situated closer to said drive spindle than said first centering surfaces, said centering members having radial supporting surfaces, said radial supporting surfaces and centering surfaces acting as disc alignment means.

9. A device as claimed in claim 1, and further comprising a collar rigidly connected to said drive spindle, and wherein said resilient means include a helical spring arranged coaxially around said drive spindle, one end of said spring bearing against said sliding bush and the other end of said helical spring bearing against said collar.

10. A device as claimed in claim 1, wherein said centering device further includes a plurality of latching hooks, said hooks extending in substantially axial directions for latching said disc in the operating position of said centering members, said latching hooks extending beyond said disc alignment means and, in the operating position of said centering members and said disc, said latching hooks extending through said center hole of said disc to latch said disc in conjunction with said disc alignment means.

11. A device as claimed in claim 10, wherein said latching hooks are positioned on limbs of said centering members.

12. A device as claimed in claim 3 or 10, and further including latching hooks positioned on said levers.

13. A device as claimed in claim 1 and further comprising a unit for inscribing and/or reading a rigid disc-shaped record carrier which is centered, aligned and clamped by said device, and wherein said unit includes an actuating device for moving said sliding bush from said first to said second position.

* * * * *